United States Patent [19]

Pollard

[11] Patent Number: 5,355,597
[45] Date of Patent: * Oct. 18, 1994

[54] DEVICE FOR DIGGING A TRENCH

[75] Inventor: Charles H. Pollard, E. Tallassee, Ala.

[73] Assignee: Brown Manufacturing Corporation, Ozark, Ala.

[*] Notice: The portion of the term of this patent subsequent to Jul. 13, 2010 has been disclaimed.

[21] Appl. No.: 46,736

[22] Filed: Apr. 16, 1993

Related U.S. Application Data

[63] Continuation of Ser. No. 904,362, Jun. 26, 1992, Pat. No. 5,226,248.

[51] Int. Cl.⁵ .............................................. E02F 5/08
[52] U.S. Cl. .............................. 37/94; 172/15; 172/548; 37/91; 37/328
[58] Field of Search ................. 37/91, 94, 64, 70, 189, 37/92, 93, 95, 326, 329, 330, 331, 327, 328, 337; 144/334; 56/13.7; 172/13, 15, 16, 17, 123, 548, 42

[56] References Cited

U.S. PATENT DOCUMENTS

| 917,821 | 4/1909 | White | 37/93 |
|---|---|---|---|
| 2,555,441 | 6/1951 | Hackney . | |
| 2,664,807 | 1/1954 | Hedrick . | |
| 2,718,838 | 9/1955 | Schumacher . | |
| 2,737,105 | 3/1956 | Wilson . | |
| 2,791,875 | 5/1957 | Faas . | |
| 3,319,365 | 5/1967 | Perry et al. . | |
| 3,958,347 | 5/1976 | Heitman | 37/94 |
| 4,002,205 | 1/1977 | Falk | 172/15 |
| 4,072,195 | 2/1978 | Carlson | 172/15 |
| 4,346,764 | 8/1982 | Rossi | 172/42 |
| 4,421,178 | 12/1983 | Vandelli et al. | 172/548 |
| 4,939,854 | 7/1990 | Boren . | |

FOREIGN PATENT DOCUMENTS

1082908 3/1984 U.S.S.R. .................... 37/91

Primary Examiner—Randolph A. Reese
Assistant Examiner—Spencer Warnick
Attorney, Agent, or Firm—Sterne, Kessler, Goldstein & Fox

[57] ABSTRACT

A device for digging a trench having a vertical face and a sloping face. The device includes a rotor configured to rotate about an axis of rotation and means for moving the device in a direction of travel substantially perpendicular to the axis of rotation. The rotor includes a longitudinal rotor member and angled end portions coupled to the longitudinal rotor member. The rotor may also include a plurality of teeth-like elements coupled to the angled end portions.

7 Claims, 6 Drawing Sheets

DEVICE FOR DIGGING A TRENCH

This application is a continuation of application Ser. No. 07/904,362, filed Jun. 26, 1992 now U.S. Pat. No. 5,226,248.

This invention relates to lawn and gardening equipment. More particularly, it relates to trenchers. Still more particularly, it relates to trenchers that define the separation of lawn sod from shrubbery or flower beds.

BACKGROUND OF THE INVENTION

Maintenance of lawn sod and landscaping plants is relatively recent in comparison with most of man's arboricultural and horticultural endeavors. However, even in modern times, maintenance of lawn sod and landscaping plants is often accomplished manually, requiting large amounts of time and manpower. Within the past few decades, new tools and methods have begun to be developed to mechanize the maintenance of lawn sod and landscaping plants.

Most smaller scale landscaping, such as for a home or business, consists of a grass lawn or sod, shrubs, and trees. Generally, shrubbery beds and sometinges trees, are separated from the grass areas. This separation can be accomplished in many ways. PlaStic, wood, or metal edging around the periphery of the shrubbery beds can be used to define the extent of the shrubbery bed. The edging, together with mulching or chemical treatment of the shrubby bed, will stop the grass from encroaching on the shrubbery beds.

A trench between the shrubbery beds and the grass areas can also be used to define the extent of the shrubbery bed. This "bed defining" trench serves to provide a clear separation of the shrubbery beds from the remainder of the landscape. The shrubbery beds can then be covered with mulch, or treated with chemicals, to prevent grass from growing. Ideally, the bed defining trench should have a straight vertical face adjacent the sod or grass area, and a sloping face which extends toward the shrubbery bed. The bed defining trench is then filled in with bed mulch, such as pine bark or pine straw. The mulch then continues up onto the shrubbery bed to form a layer of bed mulch 2–4 inches thick over the soil exhausted from the trench. In this manner, the bed mulch and the grass are at the same level at the vertical face of the trench, and the bed mulch rises up from there along the sloping face of the trench. The sloping layer of bed mulch forms a stable and aesthetically pleasing definition between the shrubbery bed and the grass area.

Presently, a trench can be dug by hand, or by a known trencher. Hand digging is expensive as it is extremely labor intensive. Additionally, the trench resulting from hand digging is less precise than if the trench were to be dug by a mechanized trencher. This is particularly true for a bed defining trench with a sloping face as described above. Known trenchers, such as a high speed rotor trencher or a chain-type trencher, can only dig a trench with two vertical faces. Different rotors are used on known trenchers depending on soil type (clay, sand, or rocky), and the width or depth of trench desired. A trench dug by a known trencher has two vertical faces, and is useful for sprinkler systems or for burying of cable or pipe. A vertical trench as dug by a known trencher can be used for bed defining when plastic, wood, or metal edging is installed in the trench. However, this method of bed defining is not preferred as the edging is nicked or cut by operation of a lawn mower or power edger. Additionally, plastic edging will warp vertically and pull up out of the ground.

A known trencher cannot dig a bed defining trench with a sloping face. A bed defining trench with a sloping face can presently be formed by digging a trench with two vertical faces using a known trencher, and then manually digging out the sloping face. Alternatively, a bed defining trench with a sloping face could be formed by manually digging the entire trench.

As will be described in detail below, the present invention overcomes the deficiencies of and problems associated with the conventional technology noted above.

SUMMARY OF THE INVENTION

The present invention is directed to a trencher, or other device for digging a trench. The device includes a rotor configured to rotate about an axis of rotation and means for moving the device in a direction of travel substantially perpendicular to the axis of rotation. The rotor includes a longitudinal rotor member and angled end portions coupled to the longitudinal rotor member, and is adapted to dig a trench having a vertical face and a sloping face. The rotor may also include a plurality of teeth-like elements coupled to the angled end portions.

FEATURES AND ADVANTAGES

The present invention has a number of features and advantages which distinguish it over known trenchers.

The trencher of this invention digs a trench which has a vertical face and a sloping face. The trencher of this invention thus digs a trench which is well suited as a bed defining trench between a grass area and a shrubbery bed.

The trencher of this invention digs bed defining trenches having graceful shapes and curves.

The trencher of this invention can be used to grind up low tree stumps. The saw dust and chips resulting from the grinding can then be easily removed.

BRIEF DESCRIPTION OF THE DRAWINGS

The invention will be better understood with respect to the accompanying drawings, in which.

DESCRIPTION OF THE PREFERRED EMBODIMENTS

The trencher of this invention will be described in detail below with reference to the presently preferred embodiment thereof. One embodiment of the trencher of this invention is shown in some detail, although it will be apparent to those skilled in the relevant art that some features which are not relevant to the invention may not be shown for the sake of clarity.

Figure 1:
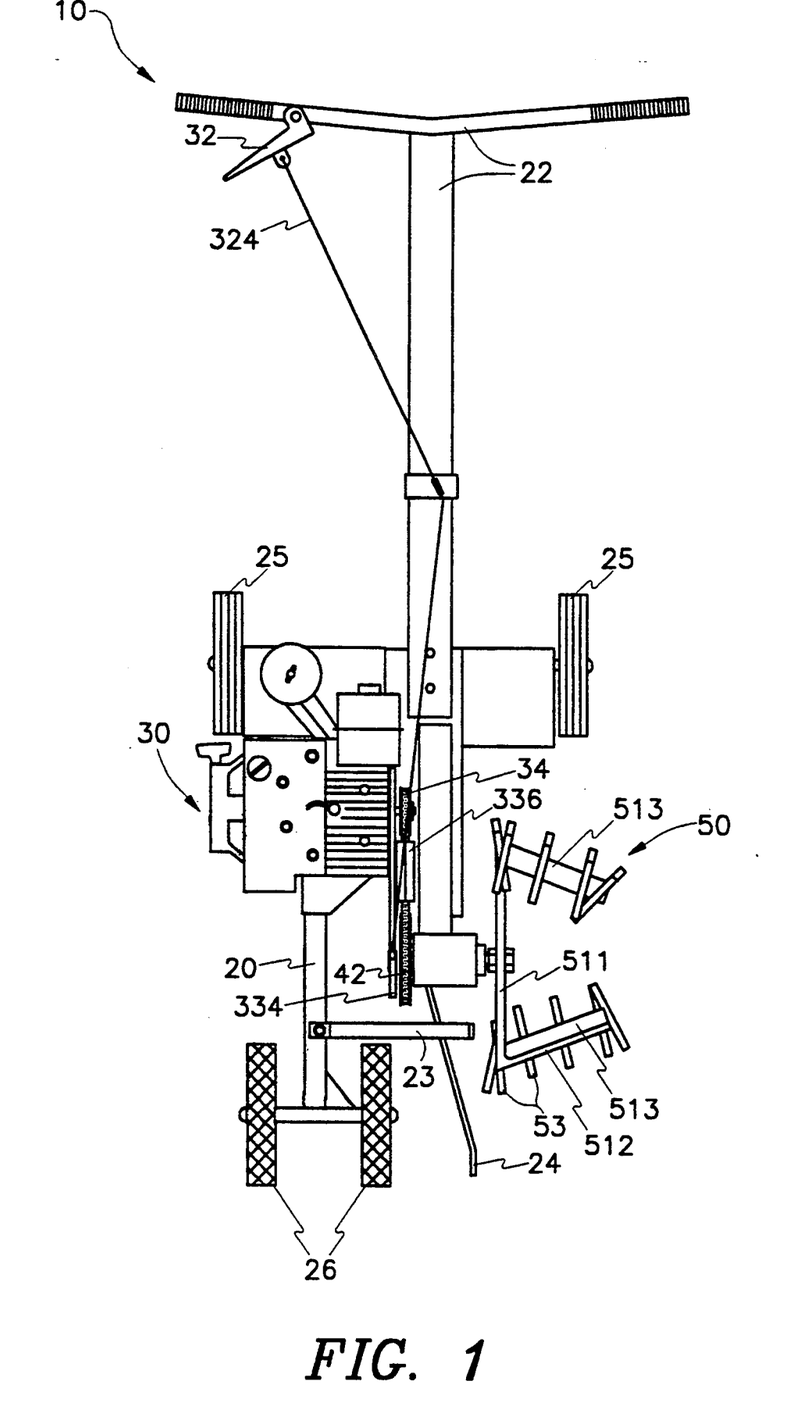
FIG. 1 shows a top view of a trencher with a bed defining rotor installed.

Referring tirst to FIG. 1, a top view of one presently preferred embodiment of this invention is shown. The trencher 10 includes a frame 20 having a handle 22. Typically, a trencher such as is shown in FIG. 1 is pulled by the user as he walks backward so that if the user's legs are doing most of the work. When in use, a hood and rubber drape (not shown) are placed over the rotor 50 for safety from the rotor and flying debris. The hood is attached to the frame 20 by an upper hood brace 23 and a front hood brace 24. The hood is also bolted directly to the portion of the frame near the engine.

The trencher 10 moves along the ground on two pairs of wheels. The first pair of wheels 25 is located at the handle end of the trencher (the "front" end of the trencher, relative to its direction of travel as it is pulled by the user), one on each side of the frame. The second pair of wheels 26 is located at the "rear" end of the trencher (relative to its direction of travel as it is pulled by the user). The rear wheels are positioned closer together than the front wheels, as the rear wheels 26 are both located on the side of the frame containing the engine. This provides for stability, as well as sufficient clearance for mounting of the rotor and the hood. The front wheels 25 and the rear wheels 26 are semi-pneumatic rubber tires on steel wheels. It is contemplated that other type wheels could be used, such as solid or pneumatic rubber tires on steel or plastic wheels.

Figure 4:
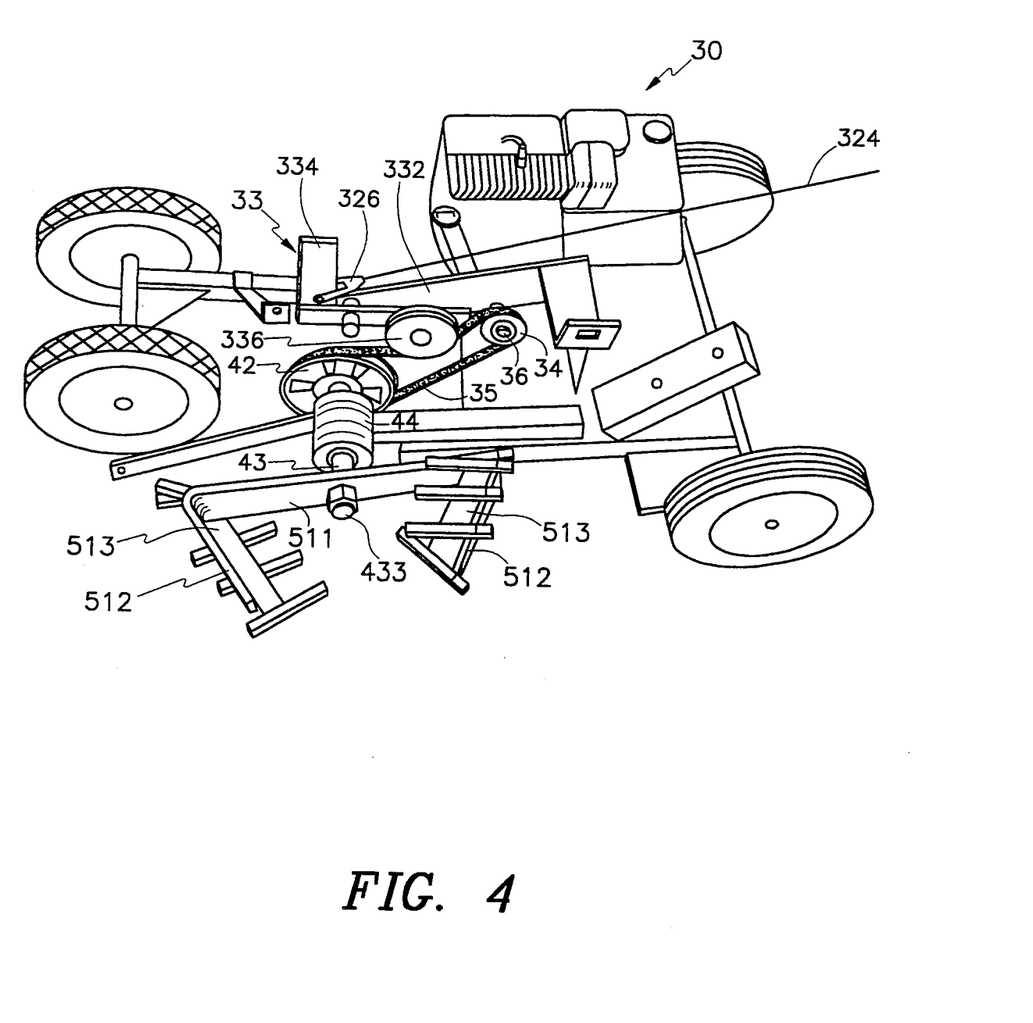
FIG. 4 shows a detail view of the rotor drive assembly of the trencher of FIG. 1.

The trencher 10 includes an engine 30 to provide the power to rotate the rotor about an axis of rotation. As shown in FIGS. 1 and 4, trencher 10 moves in a direction of travel substantially perpendicular to the axis of rotation of the rotor. It is contemplated that various types of engines can be used, such as gasoline, diesel, or electric. It is also contemplated that other means for providing the power to rotate the rotor can be used. The engine includes a rotating output shaft 36 and an engine pulley 54. The trencher also preferably includes an idler arm assembly 33 mounted to the engine on an idler bracket 332. A flat idler pulley 336 is mounted on idler arm 334 which is then attached to the idler bracket 332 (see FIG. 4). A clutch cable 324 is attached at one end to the idler arm 334 by a clevis pin assembly 326. The other end of the clutch cable 324 is attached by a spring (not shown) to a clutch lever 32 to provide a quick release to cut power to the rotor. That is, when the clutch lever is released away from the handle by the user, the idler arm 334 is rotated by the clutch cable 324 so that belt 35 goes slack. As will be described in more detail below with regard to FIG. 4, the rotor 50 will not rotate when belt 35 is slack.

Figure 3:
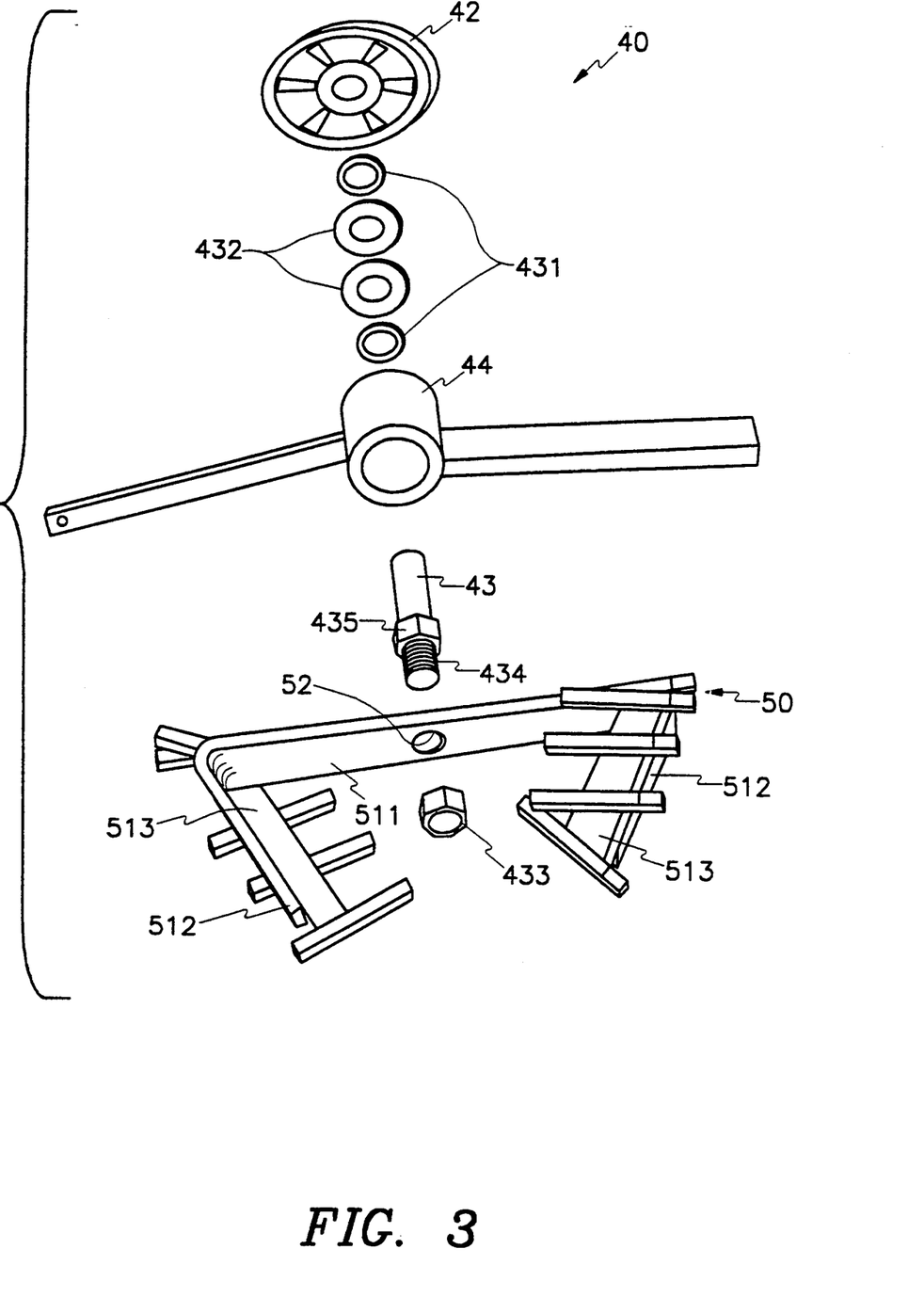
FIG. 3 shows a detail view of the attachment of the bed defining rotor of FIG. 2 to the trencher of FIG. 1.

The rotor 50 is coupled to the frame 20 through the rotor mounting assembly 40. As best seen in FIG. 3, hame 20 includes a hollow cylinder 44 which receives rotor spindle 43. Rotor 50 is attached to one end of rotor spindle 43, and rotor pulley 42 is attached to the other end of rotor spindle 43. Rotor spindle 43 is mounted in hollow cylinder 44 through use of spindle bearing 432 with a bearing lock collar 431. Preferably, the bearing lock collar 431 is a self-locking collar with a counter-bored recess which is made eccentric with the bore. The collar and the inner ring (not shown) of the spindle bearing 432 are both machined to act as mating cams on the rotor spindle 43. When the bearing lock collar 431 is engaged to the inner ring of spindle bearing 432, it grips the rotor spindle 43 tightly with a positive binding action that increases with use.

The rotor spindle 43 has a threaded end 434 which is passed through the hole 52 for mounting the rotor 50 on the rotor spindle. Rotor nut 433 is tightened so that the rotor is retained against stop nut 435.

Figure 2:
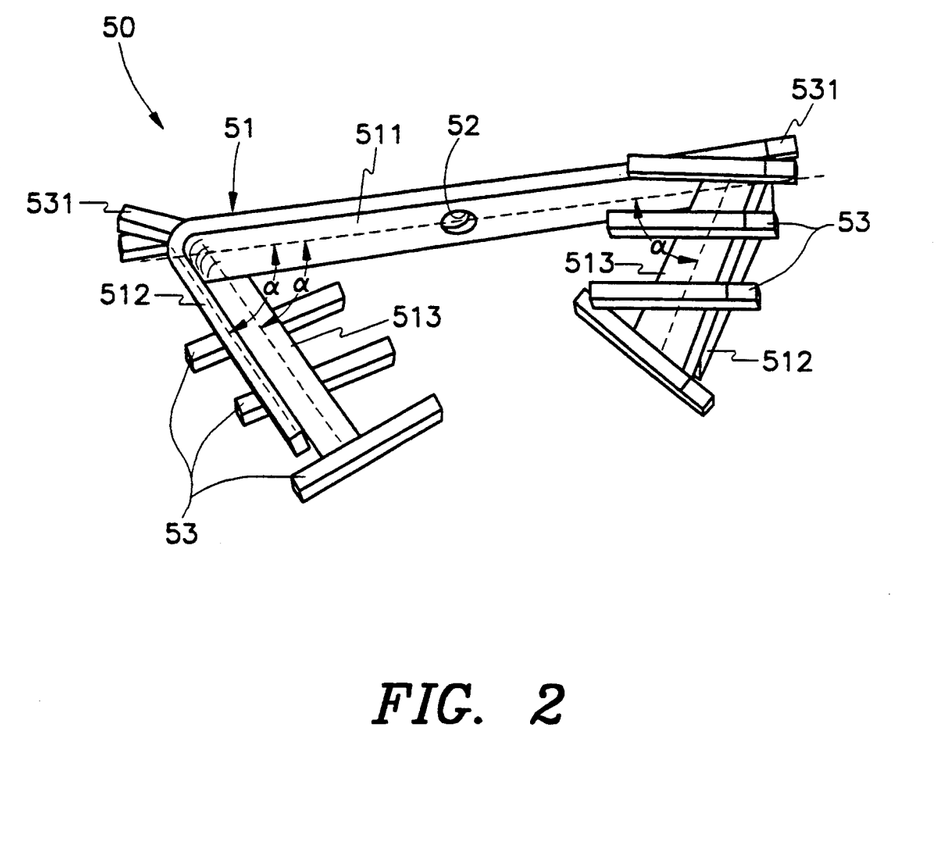
FIG. 2 shows a perspective view of a bed defining rotor.

As best seen in FIG. 2, one embodiment of rotor 50 comprises a rotor arm 51 and teeth-like elements 53. The rotor arm 51 includes a longitudinal member 511 having a central hole 52 for mounting the rotor onto the rotor spindle. Rotor arm 51 includes a transverse angled end portion 512 formed by bending longitudinal member 511. Angle $\alpha$ is formed between the central axis of longitudinal rotor arm member 511 and the central axis of angled end portion 512. Transverse reinforcing members 513 are coupled to either end of longitudinal rotor arm member 511 so that the central axis of the reinforcing members intersects the central axis of the longitudinal member at angle $\alpha$. Transverse reinforcing members 513 reinforce the angled portions 512 of rotor arm 51, and provide a flat surface for attachment of teeth-like elements 53. Transverse reinforcing members 513 are coupled (e.g., welded) to the leading or cutting edge of longitudinal member 511.

Teeth-like elements 53 are coupled to trailsverse reinforcing members 513, such as by welding. The number and orientation of the teeth-like elements can vary, and is not limited to the precise configuration shown in FIG. 2. Transverse reinforcing members 513 each have an upper and a lower surface, with the teeth-like elements 53 preferably attached on the upper surface of one of the reinforcing members, and on the lower surface of the other rehforcing member. That is, teeth-like elements 53 are attached to the leading surface of each of reinforcing members 513 so that the teeth-like elements contact the ground as the rotor rotates.

In another embodiment, rotor 50 is configured without transverse reinforcing member 513. In this embodiment, rotor 50 includes longitudinal rotor arm member 511 and transverse angled end portions 512. Transverse end portions 512 are angled so that the central axis of end portions 512 intersects the central axis of the longitudinal rotor arm member to form angle $\alpha$. The longitudinal rotor arm member 511 and angled transverse end portions 512 can be formed from a single monolithic piece of material, such as flat bar stock.

In yet another embodiment, rotor arm 51 includes only longitudinal rotor arm member 511, without transverse angled end portions 512. Transverse reinforcing members 513 are coupled (e.g., welded) to the leading or cutting edge of longitudinal member 511.

The bed defining rotor 50 of the present invention can also be configured without teeth-like elements 53. In this instance, transverse members (angled end portions 512 and/or reinforcing members 513) should preferably be made from or coated with an abrasive-resistant material, such as tungsten carbide. It is also contemplated to configure transverse reinforcing member 513 with a serrated edge which contacts the ground when digging the trench.

A detail view of the pulley assembly which is used to rotate or revolve the rotor 50 is shown in FIG. 4. Engine 30 drives a rotating output shaft 36. Engine pulley 34 is rotated by engine output shaft 36. Belt 35 drivingly connects engine pulley 34 to rotor pulley 42 so that the rotor pulley rotates with the engine pulley. As rotor pulley 42 rotates, rotor spindle 43 rotates. Since rotor 50 is mounted on the rotor spindle, rotor 50 also rotates as the rotor spindle rotates. As shown in FIG. 4, idler pulley 336 also engages belt 35. The idler pulley ensures that belt 35 has sufficient tension so that as engine pulley 34 rotates, rotor pulley 42 rotates. If belt 35 was slack, then engine pulley 34 would not drive rotor pulley 42. Idler arm 334 is rotated by clutch cable 324 by releasing clutch lever 32. Idler pulley 336 is then no longer engaged with belt 35, thereby removing the tension from the belt. Belt 35 thus goes slack so that engine pulley 34 no longer drives rotor pulley 42. In this manner, the idler arm assembly can quickly remove power to the rotor 50 by slackening belt 35. The operator of the trencher actuates the idler arm assembly to remove power by releasing clutch lever 32 attached to clutch cable 324. The operator of the trencher actuates the idler arm assembly to provide power to the rotor by squeezing clutch lever 32.

It will be clear to one skilled in the art that other means of driving the rotor can be used. For example, the rotor could be coupled directly to the engine. The rotor could also be coupled to the engine through a pulley and belt system, without the use of an idler arm assembly. However, use of an idler arm assembly provides a safer and more reliable design.

Figure 5:
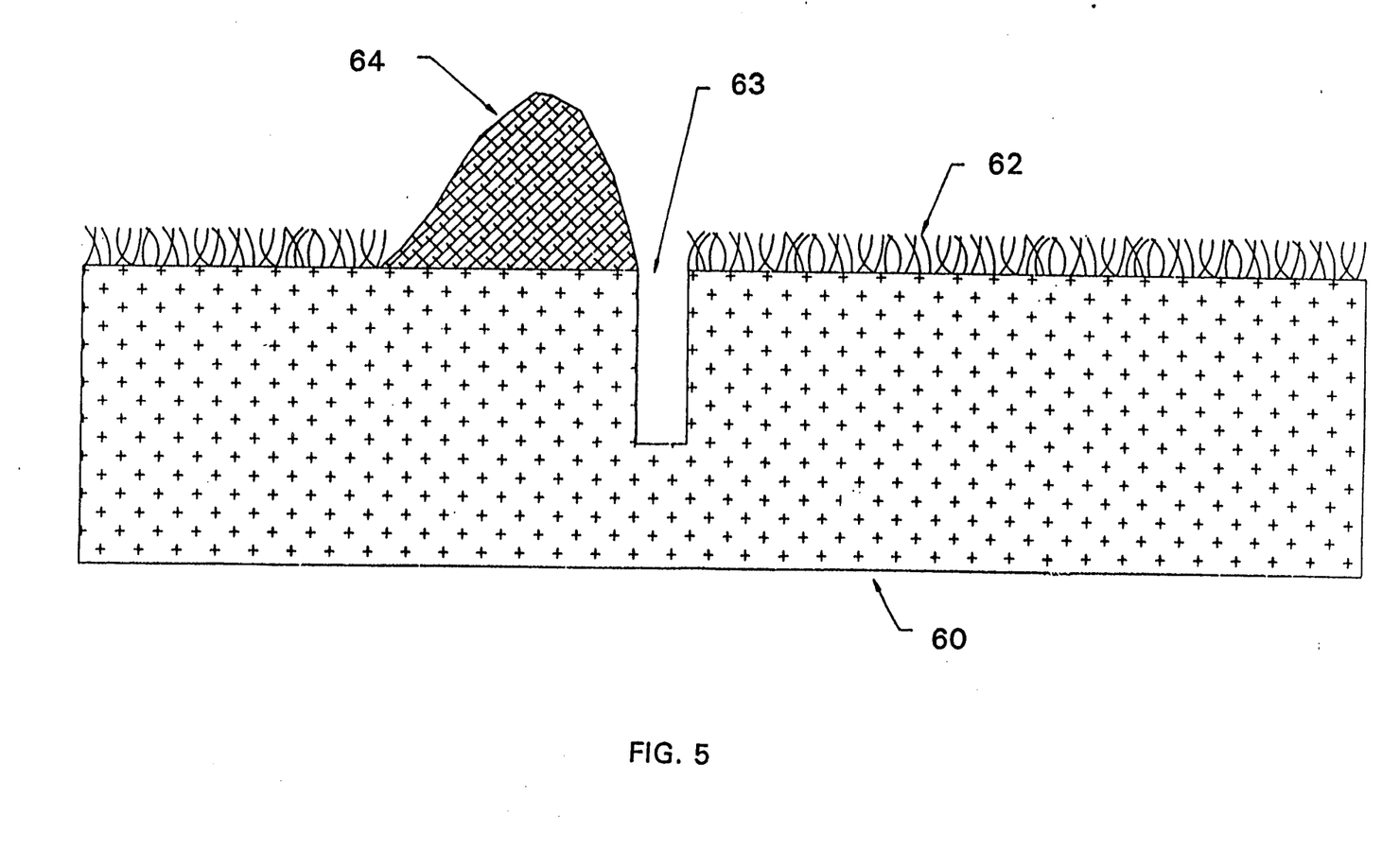
FIG. 5 shows a soil profile when using a trencher without the bed defining rotor of the present invention.

A trench with two vertical faces 63, as dug by a trencher without the bed defining rotor of the present invention, is shown in FIG. 5. Trench 63 is typically 2" wide and 7" deep in natural soil 60. Existing turf or grass 62 overlays the natural soil. Once work in the trench is complete, such as after a pipe or cable is placed in trench 63, the exhausted soil 64 is placed back in the trench.

Figure 6:
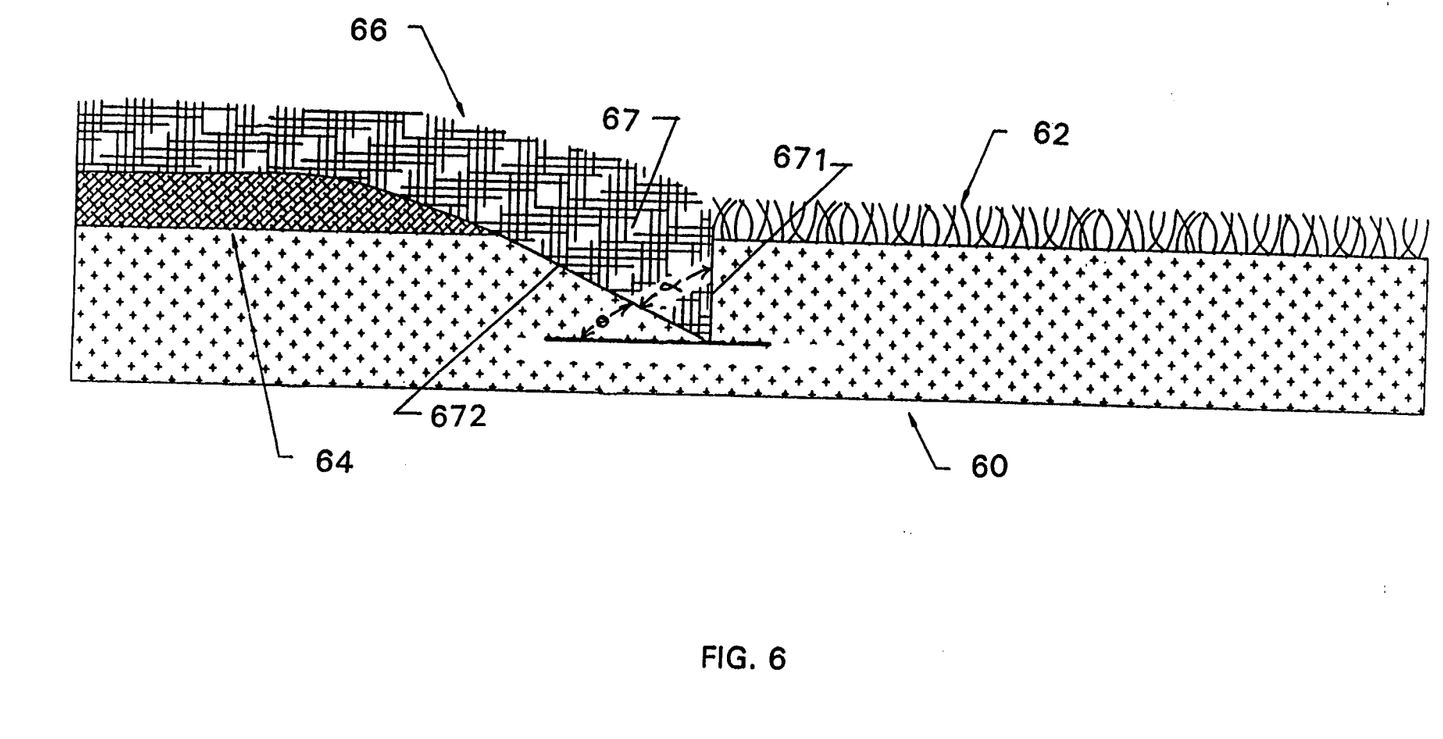
FIG. 6 shows a soil profile when using a trencher with the bed defining rotor of the present invention.

A bed defining trench 67, as dug by a trencher with the bed defining rotor 50 of the present invention, is shown in FIG. 6. Bed defining trench 67 has a vertical face 671 and a sloping face 672. Once the trench has been dug, it is filled in with bed mulch 66 so that the mulch rises up along the sloping face to form a layer 2-4" thick on the exhausted soil 64 from the trench. At the vertical face 671 of the trench, the bed mulch 66 and the existing turf 62 are at the same level. The bed mulch then continues up onto the shrubbery bed, forming a stable and aesthetically pleasing definition between the existing turf and the shrubbery bed.

The trencher of the present invention operates to dig the bed defining trench of FIG. 6 as follows. Vertical face 671 of the bed defining trench of FIG. 6 is preferably 4" and the sloping face 672 is preferably 8". The sloping face 672 of the bed defining trench thus forms an angle $\theta$ with the level ground surface. As seen in FIG. 6, angle $\alpha$ is complementary to angle $\theta$, that is, the sum of angle $\alpha$ and angle $\theta$ is 90°. Angle $\alpha$ of FIG. 6 has the same value as angle $\alpha$ formed by the intersection of the longitudinal rotor arm member with the transverse member as shown in FIG. 2. That is, the slope of the bed defining trench is formed by the angle $\alpha$ at which the transverse end portion 512 is angled with respect to longitudinal rotor arm member 511. In order to obtain the sloping face 672 of the bed defining trench, angle $\alpha$ will be less than 90°. With a vertical face 671 of 4" and a sloping face 672 of 8", angle $\theta$ is substantially equal to 26°. Therefore, angle $\alpha$ is preferably substantially equal to 64°.

The bed defining trench 67 is dug as the rotor 50 rotates. The tooth-like element 531 (shown in FIG. 2) that actually cuts the vertical face 671 of the trench is bent away from the rotor so that the longitudinal rotor arm member 511 is not running close to the vertical face. Tooth-like element 531 protrudes beyond the end of the longitudinal rotor arm member 511 and extends toward the vertical face 671 of the trench. This prevents the vertical face 671 of the trench from caving off due to dirt build up on the longitudinal rotor arm member 511' of the rotor. The digging action of tooth-like element 531 forms the bottom and vertical face of the trench.

The trencher 10 is pulled by the operator along the path which forms the spatial extent of the trench. With the engine 30 running, the engine output shaft 36 rotates the engine pulley 34. Through belt 35, the engine pulley drives the rotor pulley 42 so that it also rotates. Rotor pulley 42 rotates rotor spindle 43 and the rotor 50, which is attached to the rotor spindle. As the rotor rotates, it digs out the bed defining trench 67.

A trencher with the bed defining rotor of the present invention can also be used to grind up some low tree stumps so that they can be removed. The digging action of the rotor grinds up the stump so that the resulting saw dust and chips can easily be removed.

The trencher of this invention has been tested in actual landscaping conditions to form bed defining trenches. It has been found that a trencher with the bed defining rotor of the present invention will dig a bed defining trench at a rate up to 30 feet per minute.

While various embodiments of the present invention have been described above, it should be understood that they have been presented by way of example only, and not limitation. For example, a rotor adapted to dig a trench having a vertical face and a sloping face as described herein could be mounted on a power edger. An edger can be adjusted for depth, and can also be tilted to follow a slope. A device for digging a bed defining trench with these adjustment features could be made by mounting a bed defining rotor on a power edger. Thus the breadth and scope of the present invention should not be limited by any of the above-described exemplary embodiments, but should be defined only in accordance with the following claims and their equivalents.

What is claimed is:

1. A device for digging a trench having a vertical face and a sloping face, comprising:
    a rotor configured to rotate about an axis of rotation, said rotor comprising a longitudinal rotor member having an inner surface, an outer surface, and a central axis; a first angled end portion having a central axis; a second angled end portion having a central axis, said first and said second angled end portions coupled to said longitudinal rotor member so that said outer surface of said longitudinal rotor member faces toward said first and said second angled end portions; a plurality of teeth-like elements coupled to said first and said second angled end portions, wherein the central axes of each of said first and said second angled end portions intersect the central axis of said longitudinal rotor member to each define an acute angle between said outer surface and each said angled end portion; and
    means for moving said device in a direction of travel substantially perpendicular to said axis of rotation.

2. A device according to claim 1 wherein said longitudinal rotor member and said first and said second angled end portions are formed from a single monolithic piece of material.

3. A device according to claim 1, wherein the central axes of each of said first and said second angled end portions intersect the central axis of said longitudinal rotor member to each define said acute angle at an angle $\alpha$ so that $\alpha$ is less than 90°.

4. A device according to claim 3, wherein said angle $\alpha$ is substantially equal to 64°.

5. A device according to claim 1, wherein each of said first and said second angled end portions has a leading ground contacting surface and said plurality of teeth-like elements are coupled to said leading surface on each of said first and said second angled end portions.

6. A device according to claim 1, further comprising:
a first reinforcing member coupled to said first angled end portion, said plurality of teeth-like elements coupled to said first reinforcing member; and
a second reinforcing member coupled to said second angled end portion, said plurality of teeth-like elements coupled to said second reinforcing member.

7. A device according to claim 6, wherein each of said first and said second reinforcing members has a leading ground contacting surface and said plurality of teeth-like elements are coupled to said leading surface on each of said first and said second reinforcing members.

* * * * *